United States Patent
Chang et al.

(10) Patent No.: US 8,576,963 B2
(45) Date of Patent: Nov. 5, 2013

(54) NON-COHERENT DETECTION APPARATUS AND METHOD FOR IEEE 802.15.4 LR-WPAN BPSK RECEIVER

(75) Inventors: Tae-Gyu Chang, Seoul (KR);
Hyeon-Jin Jeon, Bucheon-si (KR);
Tanee Demeechai, Bangkok (TH)

(73) Assignee: Chung-Ang University Industry-Academy Cooperation Foundation, Gyeonggi-do (KR)

( * ) Notice: Subject to any disclaimer, the term of this patent is extended or adjusted under 35 U.S.C. 154(b) by 81 days.

(21) Appl. No.: 13/264,570

(22) PCT Filed: Apr. 13, 2010

(86) PCT No.: PCT/KR2010/002271
§ 371 (c)(1),
(2), (4) Date: Oct. 14, 2011

(87) PCT Pub. No.: WO2010/120098
PCT Pub. Date: Oct. 21, 2010

(65) Prior Publication Data
US 2012/0033768 A1   Feb. 9, 2012

(30) Foreign Application Priority Data
Apr. 16, 2009   (KR) .................. 10-2009-0033226

(51) Int. Cl.
*H03D 1/00* (2006.01)
(52) U.S. Cl.
USPC ........... 375/343; 375/150; 375/142; 375/344; 375/355; 329/306; 329/308
(58) Field of Classification Search
USPC ................. 375/343, 150, 344, 355; 329/306
See application file for complete search history.

(56) References Cited

U.S. PATENT DOCUMENTS

| | | | |
|---|---|---|---|
| 4,584,533 A * | 4/1986 | Huffman | 329/306 |
| 5,347,228 A * | 9/1994 | Iwasaki | 329/308 |
| 8,265,208 B2 * | 9/2012 | Walton et al. | 375/343 |

(Continued)

OTHER PUBLICATIONS

Gutierrez, J.A. ; Naeve, M. ; Callaway, E. ; Bourgeois, M. ; Mitter, V. ; Heile, B. "IEEE 802.15.4: a developing standard for low-power low-cost wireless personal area networks", Sep. 2001, IEEE, vol. 5 , Issue: 5, pp. 12-19.*

(Continued)

*Primary Examiner* — Daniel Washburn
*Assistant Examiner* — Berhanu Tadese
(74) *Attorney, Agent, or Firm* — William Park & Associates Patent Ltd.

(57) ABSTRACT

A non-coherent detection apparatus includes, inter alia, a correlation unit, a frequency offset estimator, and a signal detector. The correlation unit obtains a differential phase signal by multiplying a complex conjugate value of a delay signal obtained by delaying a received signal by (N+1) chips by the received signal, sums-up resultant values obtained by multiplying each component of the differential phase signal by each component of a correlation sequence and outputs a correlation signal. The frequency offset estimator estimates a frequency offset based on a value obtained by accumulatively summing-up the correlation signals corresponding to preamble portions of the received signal. The signal detector detects an original signal from the received signal based on a size of a real-number part of a resultant value obtained by multiplying the frequency offset estimated by the frequency offset estimator by the correlation signal corresponding to a PHY payload portion of the received signal.

11 Claims, 6 Drawing Sheets

(56) References Cited

U.S. PATENT DOCUMENTS

| | | | |
|---|---|---|---|
| 2004/0088609 A1* | 5/2004 | Eckhardt et al. | 714/700 |
| 2005/0105595 A1* | 5/2005 | Martin et al. | 375/140 |
| 2005/0286661 A1* | 12/2005 | Kwak | 375/343 |
| 2007/0002937 A1* | 1/2007 | Min et al. | 375/150 |
| 2008/0205492 A1* | 8/2008 | Gorday et al. | 375/150 |

OTHER PUBLICATIONS

Seongjoo Lee; Kwon, H.; Jung, Y.; Kim, J., "Efficient non-coherent demodulation scheme for IEEE 802.15.4 LR-WPAN systems", Publication Year: 2007, IEEE Electronics Letters, vol. 43, Issue: 16, pp. 879-880.*

Alberto Cavallini et al., Chip-Level Differential Encoding/Detection of Spread-Spectrum Signals for CDMA Radio Transmission over Fading Channels, IEEE Transactions on Communications, Apr. 1997, 456-463, vol. 45, No. 4.

Seongjoo Lee et al., Efficient non-coherent demodulation scheme for IEEE 802.15.4 LR-WPAN systems, Electronics Letters, Aug. 2, 2007, vol. 43, No. 16.

Ed Callaway et al. Home Networking with IEEE 802.15.4: A Developing Standard for Low-Rate Wireless Personal Area Networks, IEEE Communications Magazine, Aug. 2002, 70-77.

Jose A. Gutierrez et al., IEEE 802.15.4: A Developing Standard for Low-Power Low-Cost Wireless Personal Area Networks, IEEE Network, Sep./Oct. 2001, 12-19.

IEEE Computer Society, Part 15.4: Wireless Medium Access Control (MAC) and Physical Layer (PHY) Specifications for Low-Rate Wireless Personal Area Networks (WPANs), IEEE, Sep. 8, 2006, New York, New York.

Giulio Colavolpe et al., Improved Differential Detection of Chip-Level Differentially Encoded Direct-Sequence Spread-Spectrum Signals, IEEE Transactions on Wireless Communications, Jan. 2002, 125-133, vol. 1, No. 1.

* cited by examiner

NON-COHERENT DETECTION APPARATUS AND METHOD FOR IEEE 802.15.4 LR-WPAN BPSK RECEIVER

CROSS-REFERENCE TO RELATED PATENT APPLICATION

This application claims the benefit of Korean Patent Application No. 10-2009-0033226, filed on Apr. 16, 2009, in the Korean Intellectual Property Office, the disclosure of which is incorporated herein in its entirety by reference.

BACKGROUND OF THE INVENTION

1. Field of the Invention

The present invention relates to a non-coherent detection apparatus and method, and more particularly, to a non-coherent detection apparatus and method for an IEEE 802.15.4 low-rate wireless personal area network (LR-WPAN) binary phase shift keying (BPSK) receiver.

2. Description of the Related Art

A low-rate wireless personal area network (LR-WPAN) defined in an IEEE 802.15.4 standard has been developed for a small amount of processing and low costs, use of small energy, and local area wireless communication in cheap and mobile devices. The IEEE 802.15.4 LR-WPAN standard is widely used in home automation and home appliance markets in which home appliances operate at a maximum bit rate of 10 kbps or less. A 868/915 MHz binary phase shift keying (BPSK) physical layer from among four physical layers of the IEEE 802.15.4 standard supports a maximum bit rate of 40 kbps.

When a receiver having low power consumption and complexity is implemented, a non-coherent detection method by which coherence of a carrier wave required is used. Recently, a demodulation method using non-coherent detection by which a self-correlation method is applied to differential detection of bitstreams by using approximation has been suggested in the IEEE 802.15.4 LR-WPAN BPSK. However, it is assumed that symbol timing that is not easily obtained by the self-correlation method is known in the demodulation method. This is because, in the self-correlation method, a flat timing metric is constituted in a preamble portion of a received signal. Furthermore, the self-correlation method does not distinguish spread spectrum symbols. In other words, the self-correlation method works equally well for similar spread spectrum signals with different spreading codes.

Figure 1:
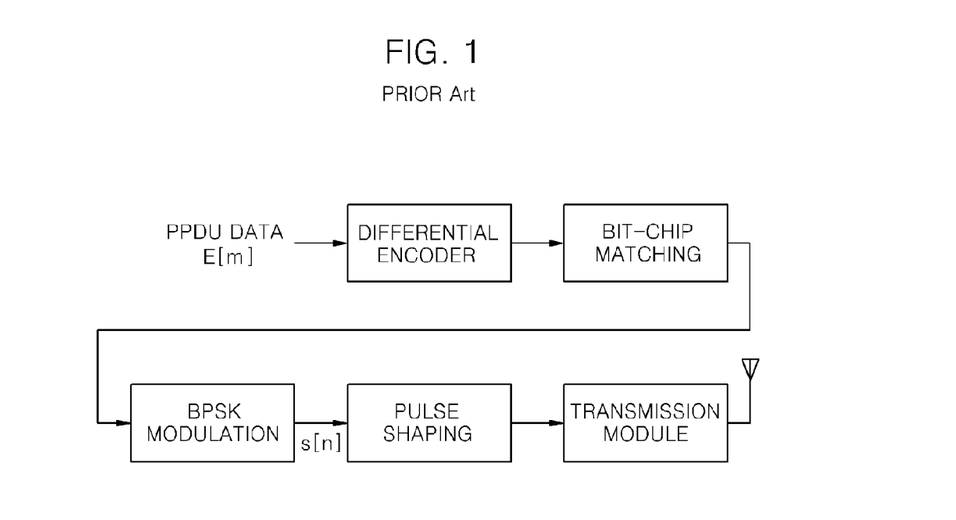
FIG. 1 is a block diagram of a transmission signal model of an IEEE 802.15.4 low-rate wireless personal area network (LR-WPAN) binary phase shift keying (BPSK) system.

FIG. 1 is a block diagram of a transmission signal model of an IEEE 802.15.4 LR-WPAN BPSK system. Referring to FIG. 1, a PHY protocol data unit (PPDU) bit sequence E[m] is differentially modulated. Each of modulated bits is allocated by a pseudorandom number (PN) C. When each modulated bit is 0, it is allocated by C, and in other cases, it is allocated by 1-C. In this case, the length of C satisfies N=15. PN sequences for the successive bits are concatenated, and the aggregate chip sequence is modulated by BPSK and then is raised-cosine pulse shaped. The raised-cosine pulse shaped chip sequence is up-converted and then is propagated through a radio frequency (RF) transmission module. A chip rate is 300 kChip/s at a band of 868 MHz and 600 kChip/s at a band of 915 MHz. In this case, a signal r[n] of a baseband received at time n is expressed using Equation 1:

$$r[n] = s[n]e^{j(\omega_0 n T_c + \theta)} + \eta_o[n] \quad (1)$$

where s[n] is a BPSK-modulated chip sequence at a transmission terminal, $\omega_0$ is a carrier wave frequency offset, $\theta$ is a phase offset, $T_c$ is a duration of a chip, and $\eta_o[n]$ is a complex AWGN sequence having a power of 1/signal-to-noise-ratio (SNR).

Meanwhile, there are two non-coherent detection methods. One is chip-level detection, and the other one is bit-level detection. In chip-level detection, a BPSK-modulated chip is searched for by using a phase difference between adjacent chips, as expressed in Equation 2:

$$c[n] = r[n]r^*[n-1] = s[n]s[n-1]e^{j\omega_0 T_c} + \eta_1[n], \quad (2)$$

$$\hat{s}[n] = \begin{cases} \hat{s}[n-1], & \text{Re}\{c[n]\} \geq 0 \\ -\hat{s}[n-1], & \text{Re}\{c[n]\} < 0 \end{cases},$$

where $(\bullet)^*$ is a complex conjugate operator, $\eta_1[n]$ is a noise term, $\hat{s}[n]$ is a chip that is detected at time n, and $\text{Re}\{x\}$ is a real-number part of x.

Chip-level detection expressed by Equation 2 may be comparatively easily implemented. However, a detection performance may be lowered, and in particular, when a frequency offset is high, the detection performance may be lowered.

A significantly higher detection performance than in chip-level detection is obtained in bit-level detection, because a soft decision value of a chip is synthesized for bit detection and a frequency offset effect is compensated for. In this case, assuming that an m-th bit of a PPDU starts from time Nm, in bit-level detection, the m-th bit of the PPDU is detected using Equation 3:

$$A_0[m] = z_0[(m+1)N - 1] \quad (3)$$

$$= \sum_{k=0}^{N-1} r[Nm+k]r^*[N(m-1)+k]$$

$$= \begin{cases} Ne^{jN\omega_0 T_c} + \eta_2, & E[m] = 0 \\ -Ne^{jN\omega_0 T_c} + \eta_2, & E[m] \neq 0 \end{cases},$$

where $\eta_2$ is a noise term.

Figure 2:
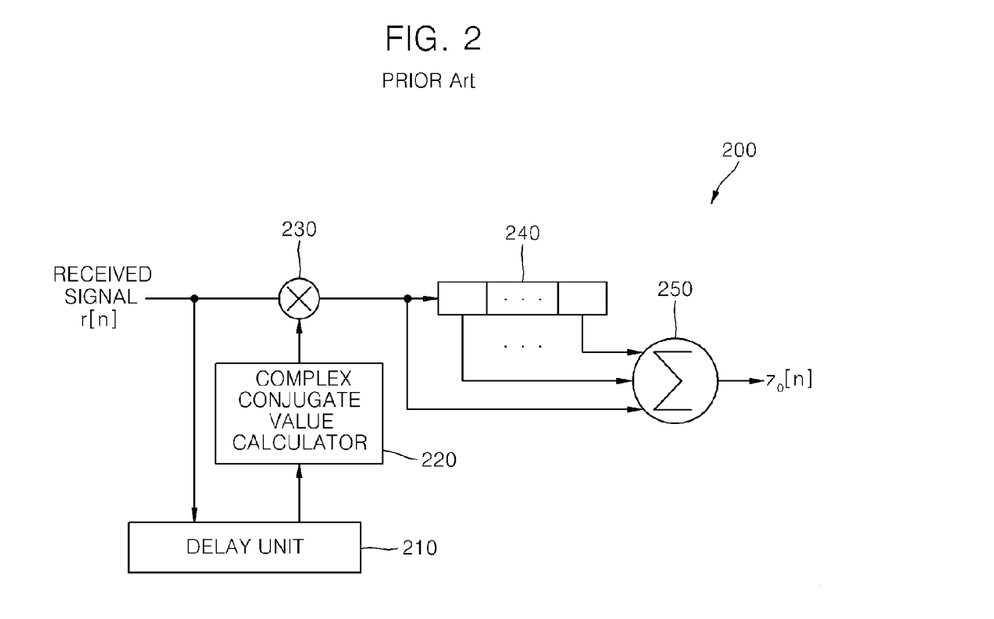
FIG. 2 is a block diagram of a correlator disposed in a conventional bit-level detection apparatus.

In Equation 3, $z_0[n]$ is obtained by a correlator disposed in a bit-level detection apparatus shown in FIG. 2 by using the self-correlation method.

FIG. 2 is a block diagram of a correlator 200 disposed in a conventional bit-level detection apparatus. Referring to FIG. 2, the correlator 200 of the conventional bit-level detection apparatus includes a delay unit 210, a complex conjugate value calculator 220, a multiplier 230, a buffer 240, and a summing-up unit 250. The delay unit 210 delays a received signal r[n] by an N chip. The complex conjugate value calculator 220 calculates a complex conjugate value of the delayed signal and outputs the result of calculation. The multiplier 230 multiplies the received signal r[n] by an output signal of the complex conjugate value calculator 220, and output values of the multiplier 230 are stored in the buffer 240 in units of chip. The summing-up unit 250 sums up the output values of the multiplier 230 stored in the buffer 240 in units of chip and calculates a self-correlation signal $z_0[n]$. In the conventional bit-level detection apparatus including the correlator 200 shown in FIG. 2, the frequency offset effect is compensated for by estimating a whole preamble of the received signal r[n] by using Equation 4:

$$Y_0 = \frac{1}{(J-1)N} \sum_{m=1}^{J-1} \sum_{k=0}^{N-1} p[Nm+k]p^*[N(m-1)+k] \quad (4)$$

$$= e^{jN\omega_0 T_c} + \eta_3,$$

where p[n] is a preamble sequence received at time 0, J is a bit number of a preamble, and $\eta_3$ is a noise term.

Meanwhile, in a demodulation method using approximation that has been recently suggested, the m-th bit of the PPDU is detected using Equation 5:

$$\hat{E}[m] = \begin{cases} 0, & \text{Re}\{A_0[m]q\{Y_0^*\}\} \geq 0 \\ 1, & \text{Re}\{A_0[m]q\{Y_0^*\}\} < 0 \end{cases}, \quad (5)$$

where q{•} is a four-level quantization function that represents approximation, and the four levels are 1, −1, j, and −j, respectively.

Figure 3:
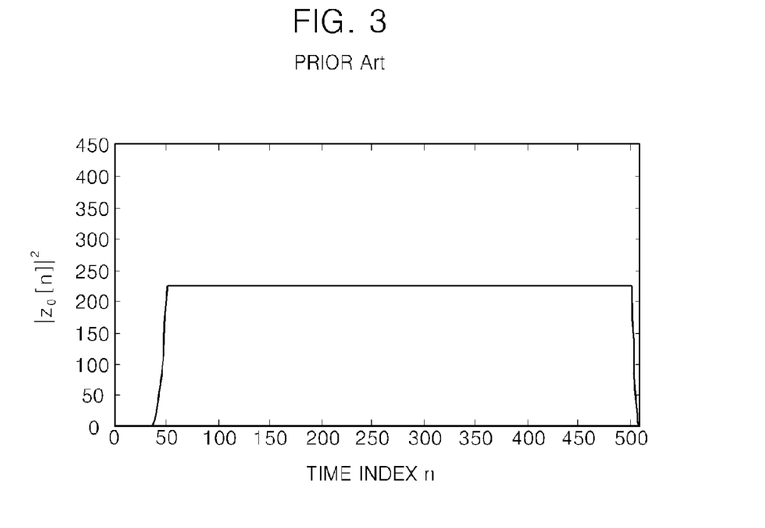
FIGS. 3 and 4 are graphs showing output patterns that are obtained by self-correlation in a preamble portion of a received signal when signal-to-noise-ratios (SNRs) are ∞ dB and 3 dB, respectively.
Figure 4:
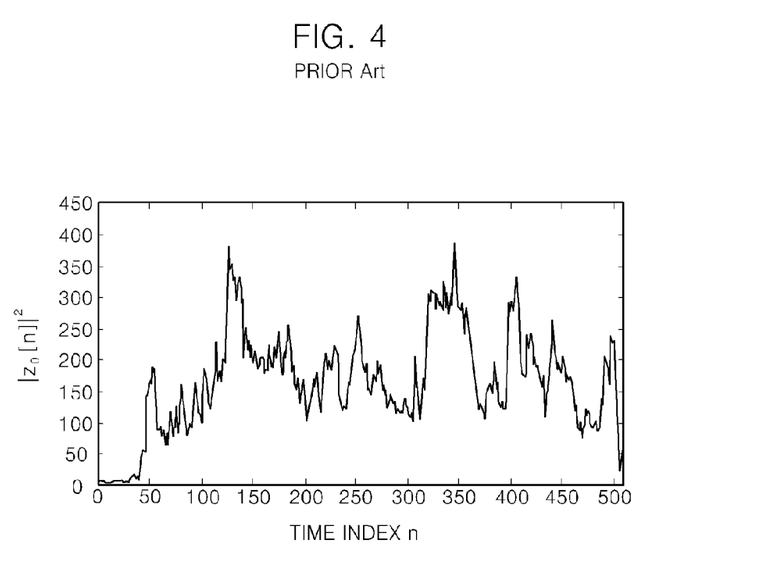

In the bit-level detection method, an excellent detection performance is obtained. However, in the bit-level detection method, it is assumed that symbol timing that is not easily obtained by the self-correlation method is known. This is because, in the bit-level detection method, a flat timing metric is constituted in a preamble portion of a received signal and it is not easily to accurately determine symbol timing. FIGS. 3 and 4 are graphs showing output patterns that are obtained by self-correlation in a preamble portion of a received signal when signal-to-noise ratios (SNRs) are ∞ dB and 3 dB, respectively. Referring to FIGS. 3 and 4, timing synchronization may not be obtained without further consideration. Furthermore, in the demodulation method using self-correlation, the value of a PN code C is not considered. Thus, a spread spectrum signal using a different PN code from that of an IEEE 802.15.4 LR-WPAN BPSK signal may be regarded as the IEEE 802.15.4 LR-WPAN BPSK signal.

SUMMARY OF THE INVENTION

The present invention provides a non-coherent detection apparatus and method for an IEEE 802.15.4 low-rate wireless personal area network (LR-WPAN) binary phase shift keying (BPSK) receiver, whereby symbol timing can be efficiently obtained and pursued by slightly increasing the number of arithmetic operations while the same detection performance as in a conventional detection method is maintained and a signal of a different similar system and an IEEE 802.15.4 LR-WPAN BPSK signal can be differentiated from each other.

According to an aspect of the present invention, there is provided a non-coherent detection apparatus including: a correlation unit obtaining a differential phase signal by multiplying a complex conjugate value of a delay signal that is obtained by delaying a received signal by a chip corresponding to a delay value that is obtained by adding a preset value to a length of a pseudorandom number (PN) code by the received signal, summing-up resultant values that are obtained by multiplying each component of the differential phase signal by each component of a correlation sequence corresponding to the received signal and outputting a correlation signal; a frequency offset estimator estimating a frequency offset based on a value that is obtained by accumulatively summing-up the correlation signals corresponding to preamble portions of the received signal from among the correlation signals; and a signal detector detecting an original signal from the received signal based on a size of a real-number part of a resultant value that is obtained by multiplying the frequency offset estimated by the frequency offset estimator by the correlation signal corresponding to a PHY payload portion of the received signal from among the correlation signals.

According to another aspect of the present invention, there is provided a non-coherent detection method including: obtaining a differential phase signal by multiplying a complex conjugate value of a delay signal that is obtained by delaying a received signal by a chip corresponding to a delay value that is obtained by adding a preset value to a length of a pseudorandom number (PN) code by the received signal, summing-up resultant values that are obtained by multiplying each component of the differential phase signal by a component of a correlation sequence corresponding to the received signal and outputting a correlation signal; estimating a frequency offset based on a value that is obtained by accumulatively summing-up the correlation signals corresponding to preamble portions of the received signal from among the correlation signals; and detecting an original signal from the received signal based on a size of a real-number part of a resultant value that is obtained by multiplying the frequency offset estimated by the frequency offset estimator by the correlation signal corresponding to a PHY payload portion of the received signal from among the correlation signals.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining exemplary embodiments of the invention with reference to the attached drawings.

Figure 5:
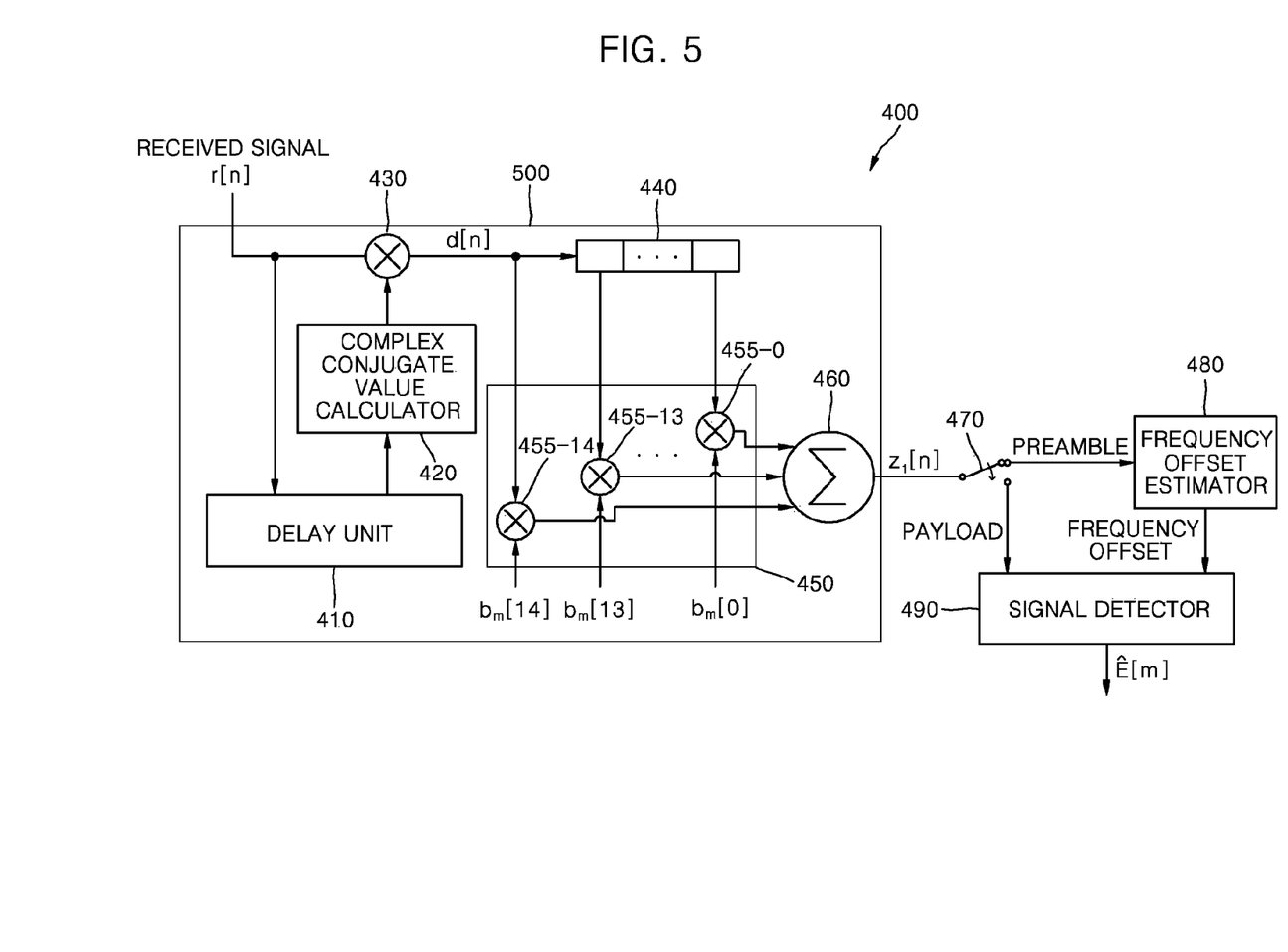
FIG. 5 is a block diagram of a non-coherent detection apparatus according to an embodiment of the present invention.

FIG. 5 is a block diagram of a non-coherent detection apparatus 400 according to an embodiment of the present invention. Referring to FIG. 5, the non-coherent detection apparatus 400 according to the current embodiment of the present invention includes a delay unit 410, a complex conjugate value calculator 420, a multiplier 430, a buffer unit 440, a cross correlation unit 450, a summing-up unit 460, a switch unit 470, a frequency offset estimator 480, and a signal detector 490.

The delay unit 410 delays a received signal r[n] by a (N+a)-chip. In this case, (N+a) is a delay value that is used to delay the received signal r[n], and N may be the length of a pseudorandom number (PN) code, and a may be set to 1 that is preset. A delay unit such as 210 of a correlator 200 of a conventional bit-level detection apparatus illustrated in FIG. 2 delays a received signal by N (i.e., the length of the PN code) chips. On the other hand, the delay unit 410 of the non-coherent detection unit 400 according to the present invention delays the received signal r[n] by (N+1) chips. Assuming that an m-th bit of a PHY protocol data unit (PPDU) is received at time Nm, the delay unit 210 of the correlator 200 of the conventional bit-level detection apparatus of FIG. 2 delays the received signal by the N chips, and thus delays the received signal in units of bit. On the other hand, the delay unit 410 of the non-coherent detection apparatus 400 according to the present invention delays the received signal r[n] by (N+1) chips, and thus delays the received signal r[n] by one more chip than in units of bit.

The complex conjugate value calculator 420 calculates the complex conjugate value of the delayed signal and outputs the result of calculation. The multiplier 430 multiplies the received signal r[n] by the output signal of the complex conjugate value calculator 420. A differential phase signal d[n] that is the output signal of the multiplier 430 is stored in the buffer unit 440 in units of chip. The cross correlation unit 450 multiplies the output signal d[n] of the multiplier 430 by a correlation sequence $B_m$ in units of chip and outputs the result of multiplication. The cross correlation unit 450 includes a plurality of multipliers 455-0 through 455-14 that correspond the length of the PN code, and each component of the correlation sequence $B_m$ having a length corresponding to the length of the PN code and each component of the differential phase signal d[n] are input to each of the multipliers 455-0 through 455-14. The summing-up unit 460 sums up multiplication values of the multipliers 455-0 through 455-14, which constitute the cross correlation unit 450, and outputs correlation signals. The delay unit 410 through the summing-up unit 460 of the non-coherent detection apparatus 400 according to the present invention constitute a correlation unit 500. The operation of the correlation unit 500 may be expressed by using Equation 6 and is used to detect the m-th bit of the PPDU.

$$A_1[m] = z_1[(m+1)N - 1] \quad (6)$$
$$= \sum_{k=0}^{N-1} d[Nm+k]b_m[k]$$
$$= \sum_{k=0}^{N-1} r[Nm+k]r^*[Nm-(N+1)+k]b_m[k],$$

where $b_m[k]$ is a k-th element of the correlation sequence $B_m$, having a length N with respect to the m-th bit of the PPDU.

According to Equation 6, a cross correlation signal $A_1[m]$ with respect to the m-th bit of the PPDU received at time Nm is obtained by performing a cross correlation operation of the correlation sequence $B_m$ and the differential phase signal d[n] for the same bit period as the correlation sequence $B_m$. The correlation sequence $B_m$ needs to be proportional to a noise version of the differential phase signal d[n] that is dependent on the PN code C and the latest actual bit E[m−1].

$$B_m = \begin{cases} [(c_{14}c_0)(c_0c_1) \ldots (c_{13}c_{14})], & E[m-1] = 0 \\ [(-c_{14}c_0)(c_0c_1) \ldots (c_{13}c_{14})], & E[m-1] \neq 0 \end{cases}, \quad (7)$$

where $c_i$ is a dipole version of an i-th element of the PN code C. However, a receiver does not know a transmitted bit value, and thus, E[m−1] of Equation 7 may be substituted with a detected value $\hat{E}[m-1]$($\hat{E}[0]=0$). According to Equations 6 and 7, assuming that detection of E[m−1] is accurately performed, the relationship between the cross correlation signals $A_1[m]$ and E[m] may be expressed by Equation 8:

$$A_1[m] = \begin{cases} Ne^{j(N+1)\omega_0 T_c} + \eta_4, & E[m] = 0 \\ -Ne^{j(N+1)\omega_0 T_c} + \eta_4, & E[m] \neq 0 \end{cases}, \quad (8)$$

where $\eta_4$ is a noise term.

Equation 8 is similar to Equation 3, and thus, a frequency offset effect $e^{j(N+1)\omega_0 T_c}$ needs to be estimated.

The frequency offset estimator 480 estimates a frequency offset from a whole preamble of the received signal r[n] by using Equation 9. In this case, in order to compare a detection performance of the non-coherent detection apparatus 400 illustrated in FIG. 4 according to the present invention with a detection performance of the conventional bit-level detection apparatus using approximation illustrated in FIG. 2, the frequency offset effect $e^{j(N+1)\omega_0 T_c}$ is similarly estimated from the whole preamble of the received signal r[n].

$$Y_1 = \frac{1}{(J-1)N-1} \left\{ \sum_{m=2}^{J-1} \sum_{k=0}^{N-1} p[Nm+k]p^*[Nm-(N+1)+k]b_m[k] + \sum_{k=1}^{N-1} p[N+k]p^*[k-1]b_1[k] \right\} \quad (9)$$
$$= e^{j(N+1)\omega_0 T_c} + \eta_5,$$

where $Y_1$ is a frequency offset, p[n] is a preamble signal received at time 0, J is a bit number of the preamble signal p[n], N is the length of a PN code, $b_m[k]$ is a k-th component of a correlation sequence with respect to an m-th bit of the PPDU, $\omega_0$ is a carrier wave frequency offset, $T_c$ is a duration of a chip, and $\eta_5$ is a noise term.

According to Equation 9, the frequency offset estimator 480 accumulatively sums up summed-up values that are obtained from each preamble signal, and then, divides the summed-up values by a value that is obtained by multiplying a value that is obtained by subtracting 1 from the bit number of the preamble signal by the length of the PN code, and estimates the divided value as the frequency offset. In this case, the switch unit 470 optionally provides the received signal r[n] to the frequency offset estimator 480 and the signal detector 490. The received signal r[n] is comprised of a synchronization header (SHR) including a preamble and a start-of-frame delimiter (SFD), a PHY header (PHR) comprised of a frame length and a reservation bit, and a PHY payload comprised of a payload of a variable length. Thus, the switch unit 470 provides an output signal corresponding to the preamble portion of the received signal r[n] from among output signals of the correlation unit 500 to the frequency offset estimator 480 by performing a switching operation and provides an output signal corresponding to the PHY payload portion of the received signal r[n] from among output signals of the correlation unit 500 to the signal detector 490. The operation of the switch unit 470 may be controlled by an additional controller.

When the frequency offset estimator 480 estimates the frequency offset effect by using Equation 9, the signal detector 490 detects an original signal $\hat{E}[m]$ based on a resultant value that is obtained by multiplying the frequency offset estimated by the frequency offset estimator 480 by the output signal corresponding to the PHY payload portion of the received signal r[n] detected by the correlation unit 500. The signal detection operation of the signal detector 490 may be expressed by Equation 10.

$$\hat{E}[m] = \begin{cases} 0, & \text{Re}\{A_1[m]Y_1^*\} \geq 0 \\ 1, & \text{Re}\{A_1[m]Y_1^*\} < 0 \end{cases} \quad (10)$$

Equation 10 may be approximated as follows.

$$\hat{E}[m] = \begin{cases} 0, & \text{Re}\{A_1[m]q\{Y_1^*\}\} \geq 0 \\ 1, & \text{Re}\{A_1[m]q\{Y_1^*\}\} < 0 \end{cases}, \quad (11)$$

where $q\{\cdot\}$ is a four-level quantization function that represents approximation, and the four levels are 1, −1, j, and −j, respectively.

In this case, the component of the differential phase signal $b_m$ is 1 or −1, and thus, the detection method using Equation 11 requires a larger number of arithmetic operations than that of the conventional detection method using approximation. Meanwhile, in the non-coherent detection method according to the present invention, once complex multiplication corresponding to four-time real-number multiplication is necessary for each sample in the multiplier 430. On the other hand, the signal detector 490 using Equation 10 necessarily needs twice real-number multiplication in each bit (i.e., per several samples). Thus, the complexity of the entire operation is slightly reduced by using approximated Equation 11. However, the approximation causes a loss of about 1.5 dB in a detection performance.

Figure 6:
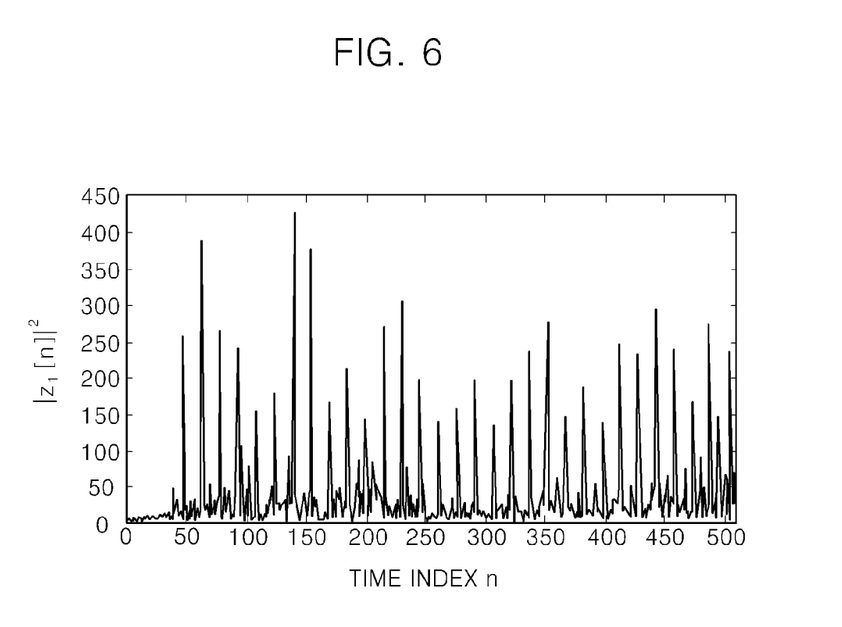
FIG. 6 is a graph showing the result of performing a cross correlation operation on a differential phase signal while a known correlation sequence is moved by one chip in a transverse direction.

In addition, it is assumed that conventional chip rate sample models, conventional other detection methods, and estimation Equations are based on timing synchronization. However, in the conventional bit-level detection apparatus of FIG. 2, it is assumed that timing synchronization is known in advance. In the non-coherent detection apparatus 400 having the structure of FIG. 4, the differential phase signal d[n] in which a rotation phase effect of the frequency offset is converted into a fixed phase effect needs to be noticed to have characteristics of a direct sequence spread spectrum signal. FIG. 6 is a graph showing the result of performing a cross correlation operation on the differential phase signal d[n] while a known correlation sequence $B_m$ is moved by one chip in a transverse direction. Referring to FIG. 6, when a signal-to-noise-ratio (SNR) is 3 dB, the value of $|z_1[n]|^2$ has a periodic vertex. Thus, in the non-coherent detection apparatus 400 according to the present invention, timing synchronization may be obtained from $z_1[n]$ that is sampled at a fractional chip rate.

Figure 7:
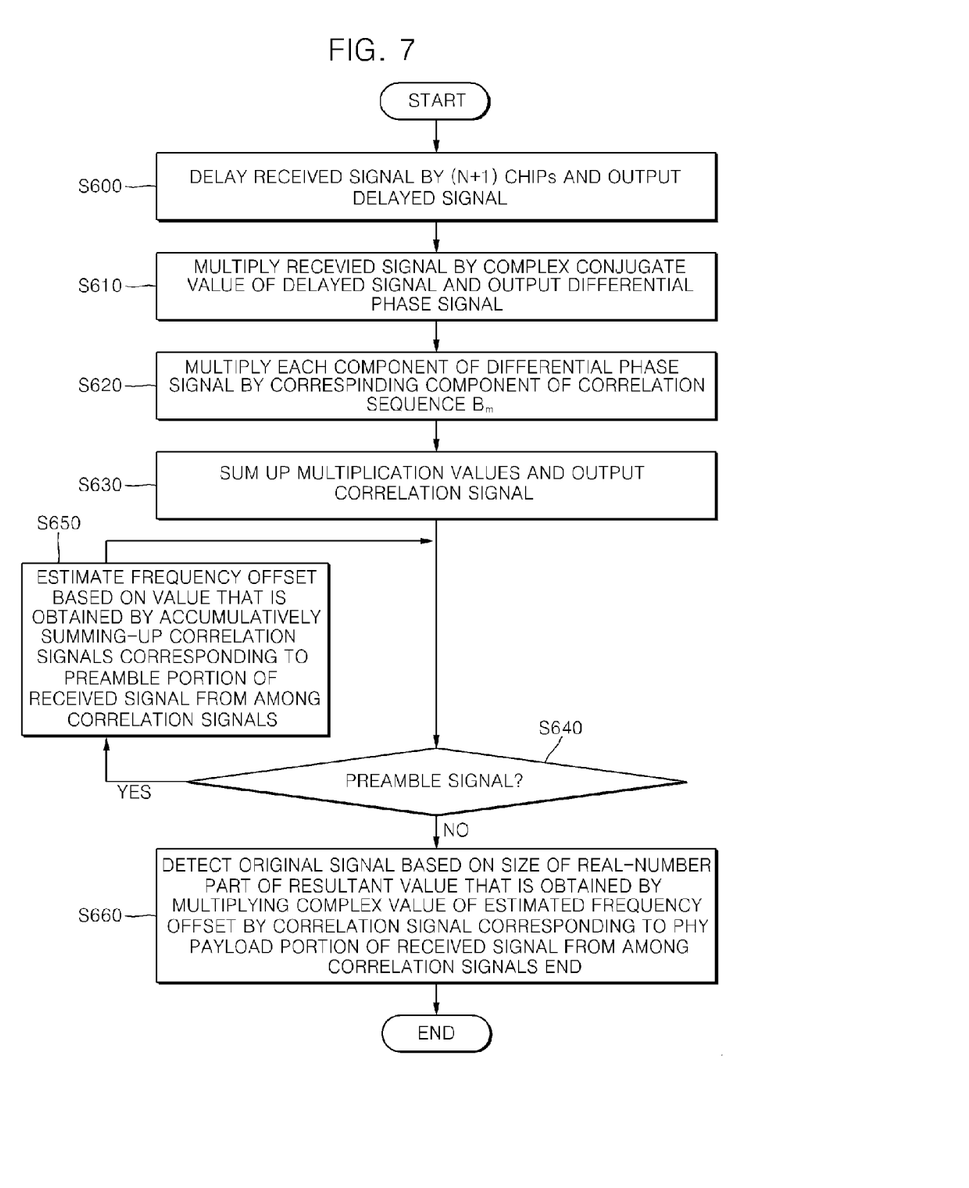
FIG. 7 is a flowchart illustrating a non-coherent detection method according to an embodiment of the present invention.

FIG. 7 is a flowchart illustrating a non-coherent detection method according to an embodiment of the present invention. Referring to FIG. 7, in Operation S600, the delay unit 410 delays the received signal d[n] by (N+1) chips and outputs the delayed signal. In Operation S610, the multiplier 430 multiplies the received signal r[n] by a complex conjugate value of the delayed signal that is calculated by the complex conjugate value calculator 420, and outputs the differential phase signal d[n]. The differential phase signal d[n] is stored in the buffer unit 440 in units of chip. In this case, the capacity of the buffer unit 440 needs to be the same as that of (N−1) chips. Next, in Operation S620, the cross correlation unit 450 multiplies each component of the differential phase signal d[n] by a component of the correlation sequence $B_m$. Next, in Operation S630, the summing-up unit 460 sums up multiplication values output from the cross correlation unit 450 and outputs correlation signals. Next, in Operation S640, the switch unit 470 provides an output signal corresponding to the preamble portion of the received signal r[n] from among output signals of the correlation unit 500 to the frequency offset estimator 480 by performing a switching operation and provides an output signal corresponding to the PHY payload portion of the received signal r[n] from among output signals of the correlation unit 500 to the signal detector 490. Next, in Operation S650, the frequency offset estimator 480 estimates a frequency offset based on a value that is obtained by accumulatively summing-up correlation signals corresponding to a preamble portion of the received signal r[n] detected by the correlation unit 500 from among the correlation signals.

Last, in Operation S660, the signal detector 490 detects an original signal that is received by using Equation 10 or 11 based on the size of a real-number part of a resultant value that is obtained by multiplying a complex value of the frequency offset estimated by the frequency offset estimator 480 by a correlation signal corresponding to the PHY payload portion of the received signal r[n] detected by the correlation unit 500 from among the correlation signals.

Comparing the non-coherent detection method according to the present invention with the conventional detection method, in the conventional detection method, the similar spread spectrum signals having different PN codes from that of an IEEE 802.15.4 LR-WPAN BPSK signal are regarded as good signals. On the other hand, in the non-coherent detection method according to the present invention, the similar spread spectrum signals having the different PN codes from that of the IEEE 802.15.4 LR-WPAN BPSK signal are regarded as interference signals. Thus, the correlation sequence $B_m$ and the PN code C of Equation 7 correspond to each other. In this regard, the sizes of components of the correlation sequence $B_m$ and the PN code C are always 1. Thus, a 1×N matrix equation of Equation 7 may be converted into N linear independent equations related to phases of $b_m[i]$ and $c_i$ (where 0≤i≤N−1). When $B_m$ and c are known, a unknown value may be properly determined.

Figure 8:
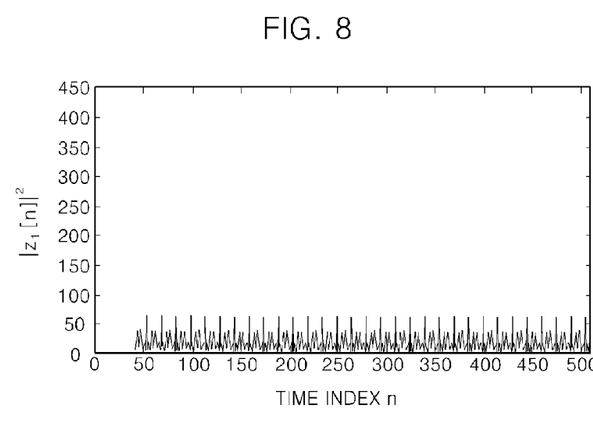
FIG. 8 is a graph showing the value of $|z_1[n]|^2$ that corresponds to a received spread spectrum signal using a PN code that is based on an m-sequence of which a generation polynomial of $1+x^3+x^4$.

Originally, the PN code of an low-rate wireless personal area network (LR-WPAN) binary phase shift keying (BPSK) system is a maximum sequence (m-sequence) having a generation polynomial of $1+x+x^4$. FIG. 8 is a graph showing the value of $|z_1[n]|^2$ that corresponds to a received spread spectrum signal using a PN code that is based on an m-sequence of which a generation polynomial of $1+x^3+x^4$. Referring to FIG. 8, the maximum power of $z_1[n]$ corresponding to a spread spectrum signal is relatively low as compared to the case where a signal is correct. Thus, in the non-coherent detection method according to the present invention, the spread spectrum signal is regarded as an interference signal. Here, the value of $|z_1[n]|^2$ with respect to a good signal satisfies $N^2=225$ at an accurate instant of detection.

Figure 9:
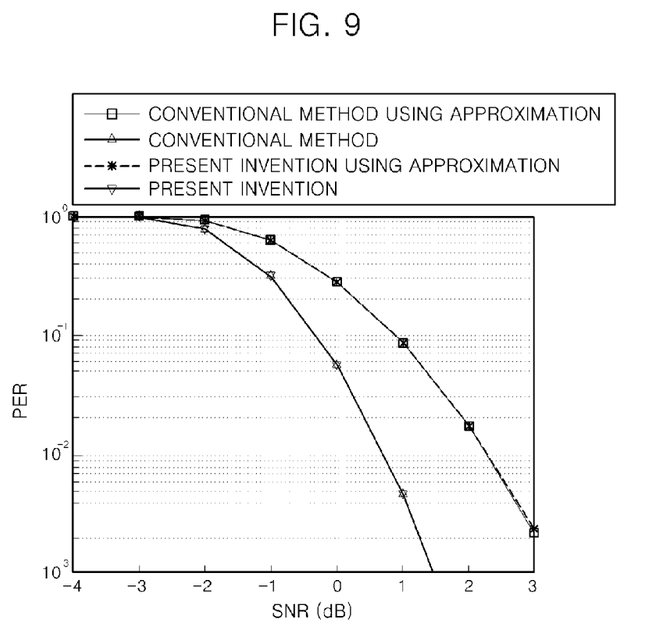
FIG. 9 is a graph showing the result of simulation performed for comparing packet error rates of a conventional bit-level detection method and a non-coherent detection method according to the present invention.

FIG. 9 is a graph showing the result of simulation performed for comparing packet error rates of a conventional bit-level detection method and a non-coherent detection method according to the present invention. When the simulation is performed, the length of the PPDU is 20 octet, and a frequency range is 915 MHz, and a frequency offset has a triangular probability density function and is set from −80 ppm to 80 ppm at discretion. Referring to FIG. 9, a packet error rate when approximation is performed in the non-coherent detection method according to the present invention is almost the same as a packet error rate when approximation is performed in the conventional bit-level detection method. This is because signal characteristics are similar in both the non-coherent detection method and the conventional bit-level detection method. In addition, a packet error rate when approximation is not performed in the conventional bit-level detection method is almost the same as a packet error rate when approximation is performed in the non-coherent detection method according to the present invention. A difference between the case where approximation is performed and the case where approximation is not performed, in both the non-coherent detection method and the conventional bit-level detection method is about 1.5 dB.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

As described above, in the non-coherent detection apparatus and method according to the present invention, symbol timing can be efficiently obtained and pursued by slightly increasing the number of arithmetic operations while the same detection performance as in a conventional detection method is maintained. In addition, the method can be compatible and shared with a conventional timing synchronization method, and an IEEE 802.15.4 LR-WPAN BPSK signal and a spread spectrum signal using a different PN code from that of the IEEE 802.15.4 LR-WPAN BPSK signal can be easily differentiated from each other.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A non-coherent detection apparatus comprising:
a correlation unit obtaining a differential phase signal by multiplying a complex conjugate value of a delay signal that is obtained by delaying a received signal by (N+1) chips (N corresponds to a length of a pseudorandom number (PN) code) by the received signal, summing-up resultant values that are obtained by multiplying each component of the differential phase signal by each component of a correlation sequence corresponding to the received signal and outputting a correlation signal;
a frequency offset estimator estimating a frequency offset based on a value that is obtained by accumulatively summing-up the correlation signals corresponding to preamble portions of the received signal from among the correlation signals; and
a signal detector detecting an original signal from the received signal based on a size of a real-number part of a resultant value that is obtained by multiplying the frequency offset estimated by the frequency offset estimator by the correlation signal corresponding to a PHY payload portion of the received signal from among the correlation signals,
wherein the frequency offset estimator estimates the frequency offset from a whole preamble of the received signal by using the following Equation C:

$$Y_1 = \frac{1}{(J-1)N-1}\left\{\sum_{m=2}^{J-1}\sum_{k=0}^{N-1}p[Nm+k]p^*[Nm-(N+1)+k]b_m[k] + \sum_{k=1}^{N-1}p[N+k]p^*[k-1]b_1[k]\right\} \quad (C)$$

$$= e^{j(N+1)\omega_0 T_c} + \eta_5,$$

where, $Y_1$ is the frequency offset, p[n] is a preamble signal received at time 0, J is a bit number of the preamble signal p[n], N is a length of the PN code, $b_m[k]$ is a k-th component of the correlation sequence with respect to the m-th bit of the PPDU, $\omega_0$ is a carrier wave frequency offset, $T_c$ is a duration of a chip, and $\eta_5$ is a noise component.

2. The apparatus of claim 1, wherein the signal detector detects the original signal by using the following Equation B:

$$\hat{E}[m] = \begin{cases} 0, & \text{Re}\{A_1[m]q\{Y_1^*\}\} \geq 0 \\ 1, & \text{Re}\{A_1[m]q\{Y_1^*\}\} < 0 \end{cases}, \quad (B)$$

where, $\hat{E}[m]$ is an original signal corresponding to the received signal corresponding to the m-th bit of the PPDU, $A_1$ is a correlation signal detected by the correlation unit, $q\{\bullet\}$ is four-level quantization function that represents approximation in which the four levels are 1, −1, j, and −j, respectively, and $Y_1$ is the frequency offset.

3. The apparatus of claim 1, wherein the correlation unit comprises:
a delay unit delaying a received signal by a chip corresponding to a delay value that is obtained by adding a preset value to a length of a PN code and outputting a delayed signal;
a complex conjugate value calculator calculating a complex conjugate value of the delayed signal and outputting the result of calculation;
a multiplier multiplying a signal output from the complex conjugate value calculator by the received signal and outputting a differential phase signal;
a buffer unit in which at least a component of the differential phase signal is stored;
a cross correlation unit multiplying the component of the correlation sequence corresponding to the received signal by each component of the differential phase signal and outputting the result of multiplication; and
a summing-up unit summing-up multiplication values output from the cross correlation unit and outputting the correlation signal.

4. The apparatus of claim 1, wherein the correlation sequence is defined by the following Equation:

$$B_m = \begin{cases} [(c_{14}c_0)(c_0c_1) \ldots (c_{13}c_{14})], & E[m-1] = 0 \\ [(-c_{14}c_0)(c_0c_1) \ldots (c_{13}c_{14})], & E[m-1] \neq 0 \end{cases},$$

where, $B_m$ is the correlation sequence, $c_i$ is a dipole version of an i-th element of a PN code, and $E[m-1]$ is an original signal of a signal received before the received signal.

5. The apparatus of claim 1, wherein the signal detector detects the original signal by using the following Equation A:

$$\hat{E}[m] = \begin{cases} 0, & \text{Re}\{A_1[m]Y_1^*\} \geq 0 \\ 1, & \text{Re}\{A_1[m]Y_1^*\} < 0 \end{cases}, \quad (A)$$

where, $\hat{E}\lfloor m \rfloor$ is an original signal corresponding to the received signal corresponding to an m-th bit of a PHY protocol data unit (PPDU), $A_1$ is a correlation signal detected by the correlation unit, and $Y_1$ is the frequency offset.

6. A non-coherent detection method comprising:
obtaining a differential phase signal by multiplying a complex conjugate value of a delay signal that is obtained by delaying a received signal by (N+1) chips (N corresponds to a length of a pseudorandom number (PN) code) by the received signal, summing-up resultant values that are obtained by multiplying each component of the differential phase signal by a component of a correlation sequence corresponding to the received signal and outputting a correlation signal;
estimating a frequency offset based on a value that is obtained by accumulatively summing-up the correlation signals corresponding to preamble portions of the received signal from among the correlation signals; and
detecting an original signal from the received signal based on a size of a real-number part of a resultant value that is obtained by multiplying the frequency offset estimated by the frequency offset estimator by the correlation signal corresponding to a PHY payload portion of the received signal from among the correlation signals,
wherein, in the estimating of the frequency offset, the frequency offset is estimated from a whole preamble of the received signal by using the following Equation C:

$$Y_1 = \frac{1}{(J-1)N-1} \left\{ \sum_{m=2}^{J-1} \sum_{k=0}^{N-1} p[Nm+k]p^*[Nm-(N+1)+k]b_m[k] + \sum_{k=1}^{N-1} p[N+k]p^*[k-1]b_1[k] \right\} \quad (C)$$

$$= e^{j(N+1)\omega_0 T_c} + \eta_5,$$

where $Y_1$ is the frequency offset, p[n] is a preamble signal received at time 0, J is a bit number of the preamble signal p[n], N is a length of the PN code, $b_m[k]$ is a k-th component of the correlation sequence with respect to the m-th bit of the PPDU, $\omega_0$ is a carrier wave frequency offset, $T_c$ is a duration of a chip, and $\eta_5$ is a noise component.

7. The method of claim 6, wherein, in the detecting of the original signal from the received signal, the original signal is detected by using the following Equation B:

$$\hat{E}[m] = \begin{cases} 0, & \text{Re}\{A_1[m]q\{Y_1^*\}\} \geq 0 \\ 1, & \text{Re}\{A_1[m]q\{Y_1^*\}\} < 0 \end{cases}, \quad (B)$$

where, $\hat{E}\lfloor m \rfloor$ is an original signal corresponding to the received signal corresponding to the m-th bit of the PPDU, $A_1$ is a correlation signal detected by the correlation unit, $q\{\bullet\}$ is four-level quantization function that represents approximation in which the four levels are 1, $-1$, j, and $-j$, respectively, and $Y_1$ is the frequency offset.

8. The method of claim 6, wherein the obtaining of the first differential phase signal comprises:
delaying the received signal by a chip corresponding to a delay value that is obtained by adding a preset value to a length of a PN code and outputting a delayed signal;
multiplying the received signal and the complex conjugate value of the delayed signal and outputting a differential phase signal;
multiplying the component of the correlation sequence corresponding to the received signal by each component of the differential phase signal and outputting the result of multiplication; and
summing-up multiplication values.

9. The method of claim 6, wherein the correlation sequence is defined by the following Equation:

$$B_m = \begin{cases} [(c_{14}c_0)(c_0c_1) \ldots (c_{13}c_{14})], & E[m-1] = 0 \\ [(-c_{14}c_0)(c_0c_1) \ldots (c_{13}c_{14})], & E[m-1] \neq 0 \end{cases},$$

where, $B_m$ is the correlation sequence, $c_i$ is a dipole version of an i-th element of a PN code, and $E[m-1]$ is an original signal of a signal received before the received signal.

10. The method of claim 6, wherein, in the detecting of the original signal from the received signal, the original signal is detected by using the following Equation A:

$$\hat{E}[m] = \begin{cases} 0, & \text{Re}\{A_1[m]Y_1^*\} \geq 0 \\ 1, & \text{Re}\{A_1[m]Y_1^*\} < 0 \end{cases}, \quad (A)$$

where, $\hat{E}\lfloor m \rfloor$ is an original signal corresponding to the received signal corresponding to an m-th bit of a PHY protocol data unit (PPDU), $A_1$ is a correlation signal detected by the correlation unit, and $Y_1$ is the frequency offset.

11. A non-transitory computer-readable media having recorded thereon a program for executing the non-coherent detection method of claim 7.

* * * * *